(12) United States Patent
Suguta et al.

(10) Patent No.: US 7,200,562 B2
(45) Date of Patent: Apr. 3, 2007

(54) MULTIMEDIA DATA DECODER

(75) Inventors: Seigo Suguta, Osaka (JP); Norio Hatanaka, Osaka (JP); Hideyuki Kakuno, Osaka (JP); Masahiro Sueyoshi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 884 days.

(21) Appl. No.: 10/336,800

(22) Filed: Jan. 6, 2003

(65) Prior Publication Data

US 2003/0191630 A1    Oct. 9, 2003

(30) Foreign Application Priority Data

Apr. 8, 2002    (JP)    ............... 2002-104833

(51) Int. Cl.
    *G10L 21/00*    (2006.01)
(52) U.S. Cl. ........................... 704/500; 341/94
(58) Field of Classification Search ............... 704/500; 341/94
    See application file for complete search history.

(56) References Cited

U.S. PATENT DOCUMENTS

| | | | |
|---|---|---|---|
| 5,148,487 A | | 9/1992 | Nagai et al. |
| 5,440,405 A | * | 8/1995 | Ahmed ........................ 358/435 |
| 5,838,678 A | | 11/1998 | Davis et al. |
| 5,917,835 A | | 6/1999 | Barrett et al. |
| 6,950,930 B2 | * | 9/2005 | Wise et al. .................. 712/300 |

FOREIGN PATENT DOCUMENTS

| | | |
|---|---|---|
| EP | 0 748 127 | 12/1996 |
| EP | 0 977 435 | 2/2000 |
| GB | 2 341 509 | 3/2000 |
| JP | 08-116314 | 5/1996 |
| JP | 08-293157 | 11/1996 |

(Continued)

OTHER PUBLICATIONS

International Standard - ISO/IEC 13818-4, first edition Dec. 1, 1998 "Informaion technology - Generic coding of moving pictures and associated audio information - part 4: conformance testing".

(Continued)

*Primary Examiner*—Daniel Abebe
(74) *Attorney, Agent, or Firm*—McDermott Will & Emery LLP

(57) ABSTRACT

The multimedia data decoder includes a decoding section and a control section. The decoding section for decoding coded data in a bit stream has a function to detect a synchronous word from the bit stream, analyze decoding information following the synchronous word and extract specific option designating information from the decoding information. The control section determines whether or not the option designating information extracted by the decoding section has any out-of-standard value, that is, any value that is not defined by a standard. If the option designating information has any out-of-standard data, the control section controls the decoding section so as to replace the out-of-standard value with a value defined by the standard and conduct a decoding process. For this purpose, the control section applies replacement information to the decoding section. Accordingly, decoded data is obtained even if the decoding information has an out-of-standard value.

1 Claim, 4 Drawing Sheets

FOREIGN PATENT DOCUMENTS

| | | |
|---|---|---|
| JP | 09-120648 | 5/1997 |
| JP | 09307516 | 11/1997 |
| JP | 10-262216 | 9/1998 |
| JP | 11-112897 | 4/1999 |
| JP | 2001-024698 A | 1/2001 |
| JP | 2001-145061 A | 5/2001 |
| JP | 2001-169251 A | 6/2001 |

OTHER PUBLICATIONS

Official communication issued on Oct. 18, 2006.

* cited by examiner

MULTIMEDIA DATA DECODER

BACKGROUND OF THE INVENTION

The present invention relates to a multimedia data decoder for decoding a bit stream of coded multimedia data (audio/image data) according to a predetermined standard.

Standards called MPEG1, MPEG2 and MPEG4 (moving picture experts group phase 1, 2 and 4), the standards named after the experts group of ISO (international organization for standardization), are conventionally well known in the art as compression standards of multimedia data. MP3 (MPEG audio layer 3) is one of the audio compression methods used in MPEG1. On the other hand, MPEG2 is used in a currently used DVD (digital versatile disk) player.

The technology disclosed in Japanese Laid-Open Publication No. 8-116314 relates to decoding of an MPEG1 audio bit stream in the second-generation EDTV (enhanced definition television), EDTV-II. According to this technology, even if an error is generated in header information of a certain audio frame within a transmission system, generation of noises due to the error is suppressed. Such suppression of noise generation is achieved as follows: if any error is detected, bit information common to header information of the MPEG1 audio bit stream is extracted from control bits of an EDTV-II digital audio format and the header information of the MPEGI audio bit stream is modified based on the extracted bit information. Thereafter, coded data in the audio frame is decoded.

Recently, many users compress music data into an MP3 format by a personal computer or the like in order to store the music data in a disk. Since the disk thus produced does not completely meet the standard of a DVD player, some troubles may occur upon reproduction of the disk by the DVD player. For example, if sampling frequency information in a certain audio frame has an out-of-standard value, a value that is not defined by the standard, coded data in this audio frame is not decoded. This results in discontinuity of sound during reproduction by the DVD player, and in the worst case, no sound may be output.

SUMMARY OF THE INVENTION

It is an object of the present invention to provide a multimedia data decoder for decoding a bit stream of coded multimedia data according to a predetermined standard, which is capable of decoding coded data even if decoding information in the bit stream has any out-of-standard data (data that is not defined by a standard).

In order to achieve the above object, a multimedia data decoder according to the present invention includes a decoding section and a control section. The decoding section for decoding coded data in a bit stream has a function to detect a synchronous word from the bit stream, analyze decoding information following the synchronous word and extract specific option designating information from the decoding information. The control section controls the decoding section so that, if the option designating information extracted by the decoding section has any out-of-standard data, that is, any value that is not defined by the standard, the decoding section replaces the out-of-standard value with a value defined by the standard and conducts a decoding process.

DESCRIPTION OF TILE PREFERRED EMBODIMENTS

Hereinafter, embodiments of the present invention will be described with reference to the accompanying drawings.

Figure 1:
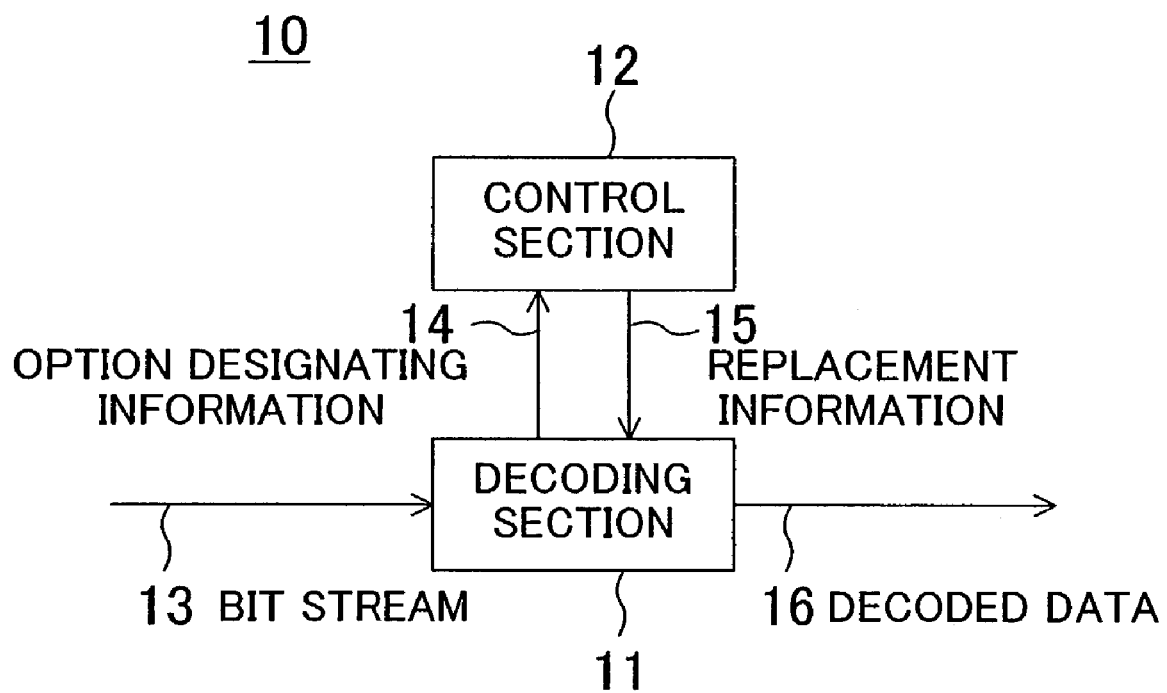
FIG. 1 is a block diagram showing an example of the structure of a multimedia data decoder according to the present invention.

FIG. 1 shows an example of the structure of a multimedia data decoder according to the present invention. The multimedia data decoder 10 of FIG. 1 is mounted in, e.g., a DVD player, and includes a decoding section 11 and a control section 12. The decoding section 1 receives a bit stream (audio bit stream or video bit stream) 13, and decodes coded data in the bit stream 13. The decoding section 1 has a function to detect a synchronous word from the bit stream 13, analyze decoding information following the synchronous word, and extract specific option designating information 14 from the decoding information. The control section 12 determines whether or not the option designating information 14 extracted by the decoding section 11 has any out-of-standard value, i.e., any value that is not defined by the standard of the DVD player. If the option designating information 14 has any out-of-standard value, the control section 12 then controls the decoding section 11 so as to replace the out-of-standard value with a value defined by the standard and conduct a decoding process. The control section 12 applies replacement information 15 to the decoding section 11 for this purpose. The decoding section 11 thus can decode the coded data and output decoded data 16 even if the decoding information in the bit stream 13 has any out-of-standard data.

Figure 2:
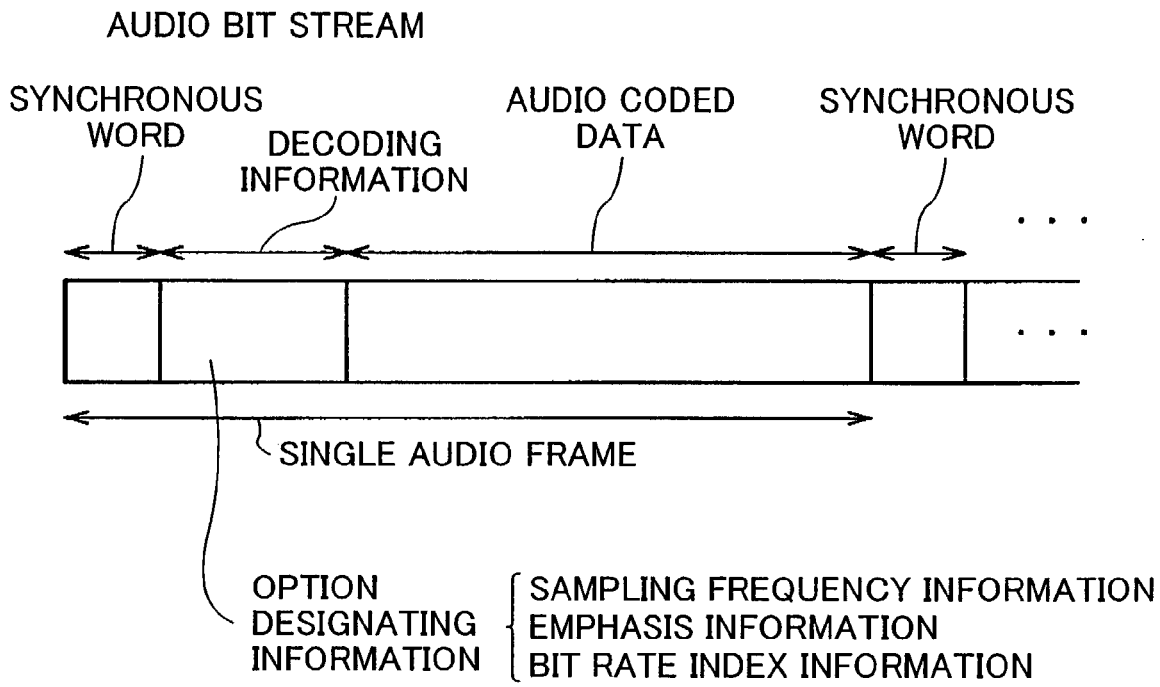
FIG. 2 shows an example of a format of an audio bit stream which is applied to the multimedia data decoder of FIG. 1.

FIG. 2 shows an example of a format of an audio bit stream which is applied to the multimedia data decoder 10 of FIG. 1. Each audio frame is formed by a synchronous word, decoding information following the synchronous word, and audio coded data following the decoding information. The decoding section 11 analyzes the decoding information and extracts specific option designating information therefrom. The option designating information herein refers to at least one of sampling frequency information, emphasis information, and bit rate index information. For example, the sampling frequency information is represented by a code designating one of a plurality of sampling frequencies that may be used in the standard of the DVD player. Note that the synchronous word and the decoding information are sometimes collectively referred to as a header.

Figure 3:
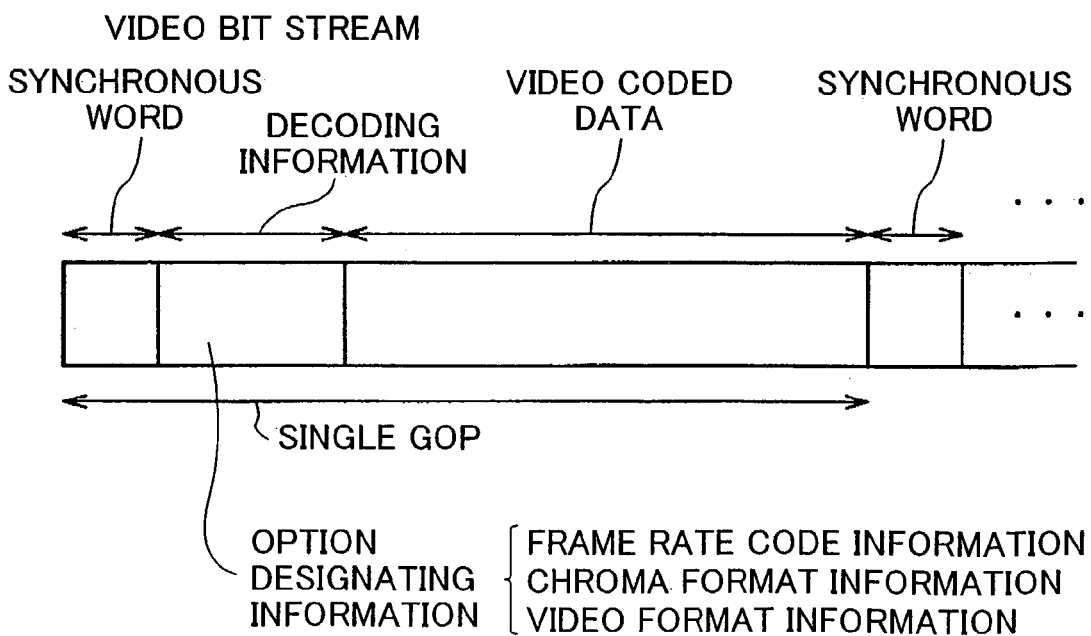
FIG. 3 shows an example of a format of a video bit stream which is applied to the multimedia data decoder of FIG. 1.

FIG. 3 shows an example of a format of a video bit stream which is applied to the multimedia data decoder 10 of FIG. 1. Each GOP (group of pictures) is formed by a synchronous word, decoding information following the synchronous word, and video coded data following the decoding information. The decoding section 11 analyzes the decoding information and extracts specific option designating information therefrom.

The option designating information herein refers to at least one of frame rate code information indicating the number of frames to be displayed per second, chroma format information designating one of 4:2:0, 4:2:2 and 4:4:4, and video format information indicating a video format such as NTSC (national television system committee) and PAL (phase alteration line). Each of the frame rate code information, the chroma format information and the video format information belongs to a sequence layer of the video bit stream.

Figure 4:
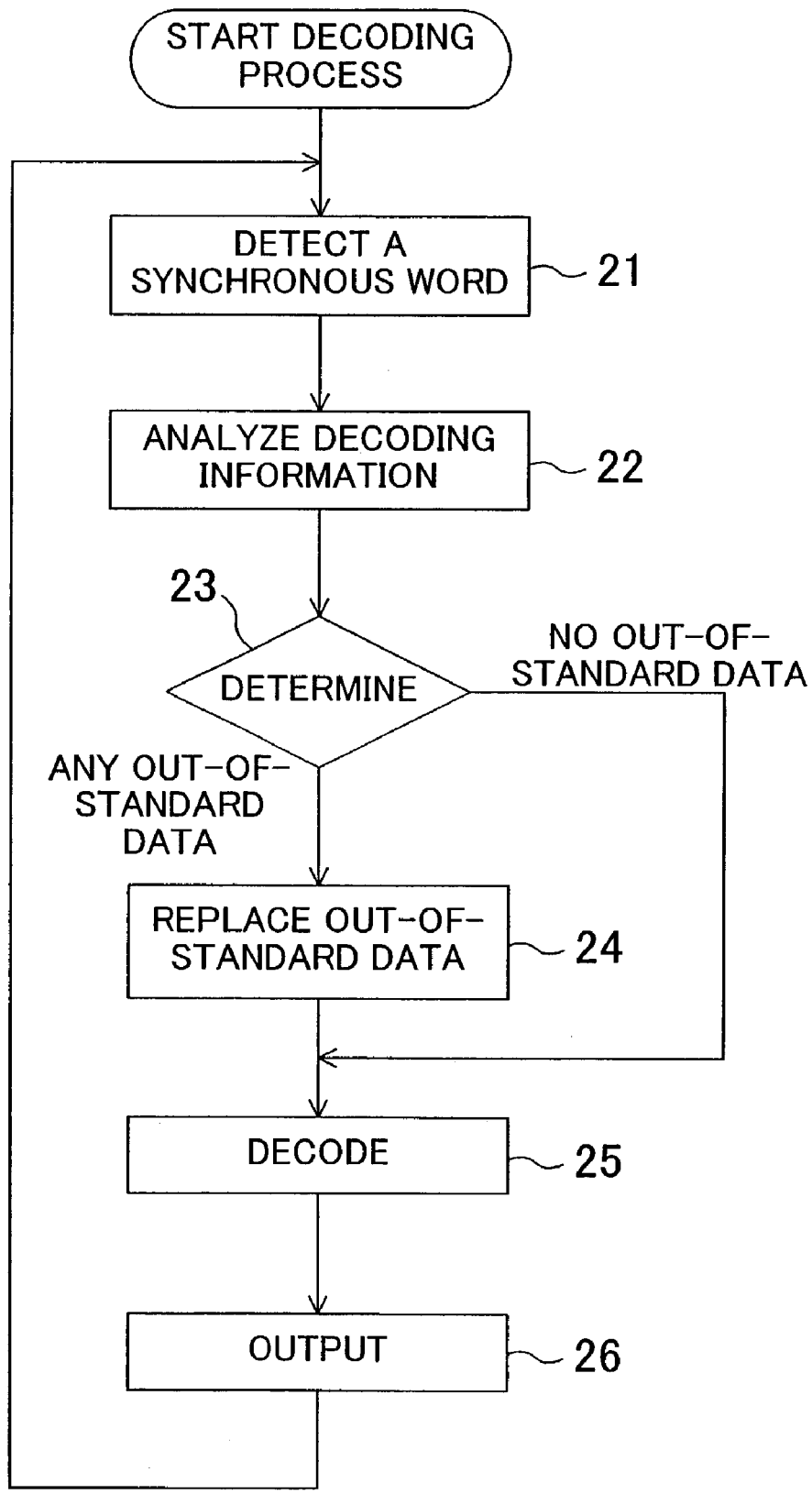
FIG. 4 is a flowchart schematically illustrating operation of the multimedia data decoder of FIG. 1.

FIG. 4 schematically illustrates operation of the multimedia data decoder 10 of FIG. 1. In step 21, the decoding section 11 detects a synchronous word in the applied bit stream 13 of the format of FIG. 2 or FIG. 3. If the synchronous word is detected in step 21, the decoding section 11 then analyzes decoding information in step 22. In step 22, the decoding section 11 obtains option designating information 14 such as sampling frequency information. After step 22, the routine proceeds to step 23.

In step 23, the control section 12 determines whether or not the option designating information 14 has any out-of-standard value, that is, any value that is not defined by the standard of the DVD player. If it is determined in step 23 that the option designating information 14 has no out-of-standard value, the decoding section 11 then conducts a decoding process in step 25. On the other hand, if it is determined in step 23 that the option designating information 14 has any out-of-standard value, the control section 12 applies replacement information 15 to the decoding section 11, and the decoding section 11 replaces the out-of-standard value in step 24. Step 24 may be conducted so that the out-of-standard value is replaced with a predetermined value. In most cases, data in a music CD (compact disk) is compressed into an MP3 format. In such cases, if the sampling frequency information has any out-of-standard value, the out-of-standard value is replaced with a predetermined value "44.1 kHz". Regarding the emphasis information, most disks on the market has a value "emphasis OFF". Therefore, if the emphasis information has any out-of-standard value, the out-of-standard value is replaced with a predetermined value "emphasis OFF". The out-of-standard value may alternatively be replaced with a value that was used in the previous decoding process. After step 24, the routine proceeds to step 25, and a decoding process is conducted.

In step 25, the decoding section 11 decodes coded data. Thereafter, the decoding section 11 outputs decoded data 16 in step 26, and the routine then returns to step 21. The coded data is decoded by repeatedly conducting the series of steps 21 to 26.

Figure 5:
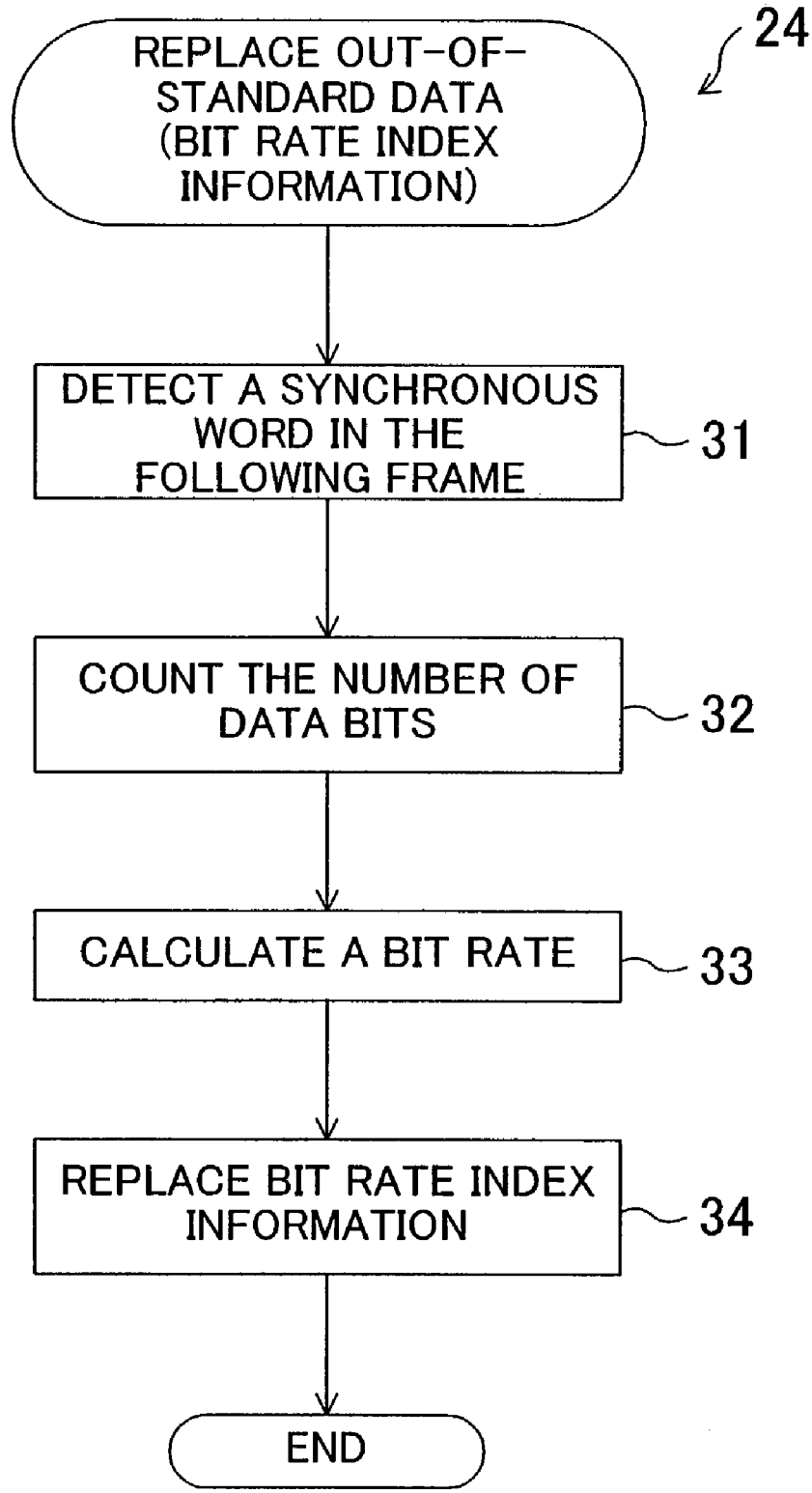
FIG. 5 is a flowchart illustrating a specific example of the step of replacing out-of-standard data as shown in FIG. 4, which is conducted when bit rate index information of FIG. 2 has any out-of-standard data.

FIG. 5 shows a specific example of the replacing step (step 24 in FIG. 4). It is herein assumed that the bit rate index information in FIG. 2 has an out-of-standard value. First, a synchronous word in the following audio frame is detected in step 31. The number of bits in the coded data up to the synchronous word is counted in step 32. The control section 12 calculates a bit rate based on the count value obtained in step 32 and the sampling frequency information in the decoding information (step 33), and then replaces the out-of-standard value in the bit rate index information with a value indicating the calculated bit rate (step 34).

As has been described above, the multimedia data decoder 10 of FIG. 1 can prevent discontinuity of sound and image even if decoding information in an applied bit stream 13 has any out-of-standard data.

Note that, in the above description, the present invention is applied to decoding of coded data from storage media such as DVD. However, the present invention is also applicable to decoding of coded data in communications media and broadcasting media.

What is claimed is:

1. A multimedia data decoder for decoding a bit stream of coded multimedia data according to a predetermined standard, comprising:

a decoding section having a function to detect a synchronous word from the bit stream, analyze decoding information following the synchronous word and extract specific option designating information from the decoding information in order to decode coded data in the bit stream; and a control section for controlling the decoding section so that, if the extracted option designating information has any out-of-standard data, that is, any value that is not defined by the standard, the decoding section replaces the out-of-standard value with a value defined by the standard and conducts a decoding process, wherein the option designating information is bit rate index information in an audio bit stream, and the control section has a function to conduct a control operation so as to calculate a bit rate based on sampling frequency information in the decoding information and the number of bits in the coded data up to a following synchronous word and replace the out-of-standard value with a value indicating the calculated bit rate.

* * * * *